US012589890B2

(12) United States Patent
Zhang et al.

(10) Patent No.: US 12,589,890 B2
(45) Date of Patent: Mar. 31, 2026

(54) TESTING DEVICE AND TESTING METHOD OF COMPOSITE BLADE TILT ROTOR POWER ASSEMBLY

(71) Applicant: HANGZHOU CITY UNIVERSITY, Hangzhou (CN)

(72) Inventors: Xinfeng Zhang, Hangzhou (CN); Xufang Zhang, Hangzhou (CN); Liping Yang, Hangzhou (CN); Bing Rao, Hangzhou (CN); Wenwei Mo, Hangzhou (CN)

(73) Assignee: HANGZHOU CITY UNIVERSITY, Hangzhou (CN)

( * ) Notice: Subject to any disclaimer, the term of this patent is extended or adjusted under 35 U.S.C. 154(b) by 209 days.

(21) Appl. No.: 18/571,773

(22) PCT Filed: Oct. 30, 2023

(86) PCT No.: PCT/CN2023/127448
§ 371 (c)(1),
(2) Date: Dec. 19, 2023

(87) PCT Pub. No.: WO2024/099122
PCT Pub. Date: May 16, 2024

(65) Prior Publication Data
US 2025/0136294 A1 May 1, 2025

(30) Foreign Application Priority Data
Nov. 10, 2022 (CN) .......................... 202211401835.9

(51) Int. Cl.
*B64F 5/60* (2017.01)
*G01M 9/06* (2006.01)

(52) U.S. Cl.
CPC ................ *B64F 5/60* (2017.01); *G01M 9/06* (2013.01)

(58) Field of Classification Search
CPC ..................................... B64F 5/60; G01M 9/06
(Continued)

(56) References Cited

FOREIGN PATENT DOCUMENTS

| CN | 109018430 A | * 12/2018 | ................ B64F 5/60 |
| CN | 111516903 A | * 8/2020 | ................ B64F 5/60 |
| CN | 111707442 A | * 9/2020 | .............. G01M 9/08 |

* cited by examiner

*Primary Examiner* — Peter J Macchiarolo
*Assistant Examiner* — John M Royston
(74) *Attorney, Agent, or Firm* — Sheehan Phinney Bass & Green PA

(57) ABSTRACT

A testing device and a testing method of a composite blade tilt rotor power assembly are related. The testing method includes the following steps: installing a tilt rotor flight power assembly on a flange platform of a testing device through a connector; confirming normal operation of an external power supply, the tilt rotor flight power assembly and a data acquisition computer; starting the tilt rotor flight power assembly, and controlling a tilt motor to rotate a cantilever shaft according to a tilt angle instruction; and recording the energy consumption and the tensile forces and torques in x, y and z directions of the tilt rotor flight power assembly by the data acquisition computer in real time. The testing method has the beneficial effects that the processes of starting, starting and stopping, hovering and descending can be simulated for the composite blade tilt rotor power assembly which is a core driving component of a vertical take-off and landing type electric driving hovercar, and the flight performance of the hovercar can be tested. The testing method can also be used for cold rotation test, take-off strategy verification test, hover strategy verification test, durability test and acceleration performance test of the composite blade tilt rotor power assembly.

7 Claims, 5 Drawing Sheets

(58) Field of Classification Search
USPC ........................................................... 73/147
See application file for complete search history.

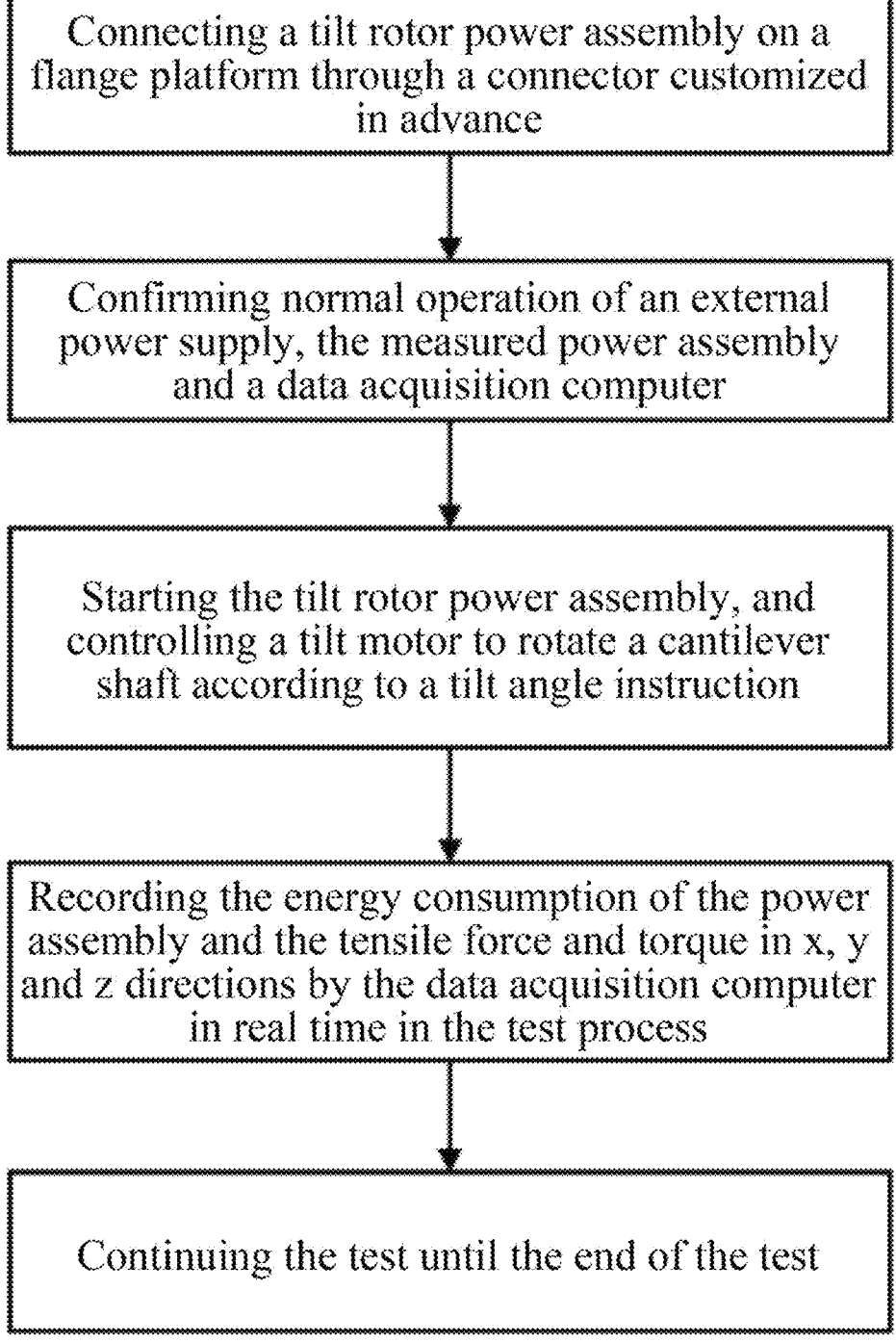

Connecting a tilt rotor power assembly on a flange platform through a connector customized in advance Confirming normal operation of an external power supply, the measured power assembly and a data acquisition computer Starting the tilt rotor power assembly, and controlling a tilt motor to rotate a cantilever shaft according to a tilt angle instruction Recording the energy consumption of the power assembly and the tensile force and torque in x, y and z directions by the data acquisition computer in real time in the test process Continuing the test until the end of the test

FIG. 6

TESTING DEVICE AND TESTING METHOD OF COMPOSITE BLADE TILT ROTOR POWER ASSEMBLY

CROSS REFERENCE TO RELATED APPLICATION

This application is a national stage application of International Patent Application No. PCT/CN2023/127448, filed on Oct. 30, 2023, which claims the priority of Chinese Patent Application No. 202211401835.9 entitled "TESTING DEVICE AND TESTING METHOD OF COMPOSITE BLADE TILT ROTOR POWER ASSEMBLY" filed with the Chinese Patent Office on Nov. 10, 2022, which is incorporated herein by reference in its entirety.

TECHNICAL FIELD

The present disclosure relates to a testing device and a testing method of a composite blade tilt rotor power assembly, in particular to a testing technology and a testing method of driving devices and parts of high-power electrically-driven manned low-altitude aircrafts and hovercars.

BACKGROUND

The hovercars are the first choice to solve traffic congestion and three-dimensional traffic in the future. Up to 2020, there are more than 160 hovercar factories in the world, which are mainly concentrated in America and Europe. At present, most of hovercar products are in the flight test stage, and a few of the hovercars are scheduled and delivered. It is predicted that by 2030, the hovercar industry will create a market size of 300 billion US dollars, and some market shares of ground transportation, aircraft and public transportation will be transformed. The electric tilt rotor hovercar has the characteristics of vertical take-off and landing, horizontal flight and so on, and is the most flexible and highest performance type in all low-altitude aircrafts.

The composite blade tilt rotor is the most critical assembly component of the aircraft, provides lift force to the aircraft, and can control the aircraft to fly. The performance of the tilt rotor directly determines the performance and reliability of the aircraft. The tilt rotor aircraft has a vertical lifting flight mode and a fixed wing flight mode, and the difference of rotor working conditions is great under different modes. Therefore, the test of the composite blade rotor assembly is very important in the design and verification process of the rotor system, and the final assembly and test process of the tilt rotor unmanned aerial vehicle.

However, the existing published patents and scientific and technological documents mainly focus on the testing of unmanned aerial vehicles and the testing of helicopter coaxial systems. For example, a tilt rotor test device published by Nanjing University of Aeronautics and Astronautics (with the patent number of CN202111477072.1) adopts a universal hinge type tilt mechanism. According to a test bench and a testing method of a tilt rotor aircraft rotor system published by Shenyang Institute of Automation, Chinese Academy of Sciences (with the patent number of CN202111366809.2), the test bench includes a supporting cover body and a platform body. A tilt rotor unmanned aerial vehicle test bench (patent number CN202010413232.5) published by Honeycomb Aerospace Technology (Beijing) Co., Ltd. adopts a cross-shaped test bench structure. A test system and a control method for an all-state blowing experiment of a tilt rotor aircraft published by Nanjing University of Aeronautics and Astronautics (with the patent number of CN201710619079. X) is mainly aimed at a blowing experiment control system of an unmanned aerial vehicle model. A coaxial tilt rotor aerodynamic performance test platform and a testing method published by Fuzhou University (with the patent number of CN201710200400.0) are mainly aimed at an adjusting system of a coaxial tilt rotor aerodynamic test process. However, there are few devices for testing the performance of the electrically-driven composite blade tilt rotor power assembly.

There are the following problems in the performance test of the electrically-driven composite blade tilt rotor power assembly in the prior art. Firstly, under the conditions of an unstable system program, imperfect structural design and immature technology and quality, many risks are bound to be hidden in the test process. Secondly, most of the rotor system test benches have a single function and complicated operation. To complete the test verification of a rotor system, it is necessary to make multiple sets of tooling to match different test systems, adjust the state of the tilt rotor assembly, and test and evaluate the dynamic performance, economy, start-stop performance, balance and other performances. The test period is long, so that the research and development cost and cycle of the rotor system and the tilt rotor aircraft are increased.

The purpose of the present disclosure is to overcome the danger in the test process of the composite blade tilt rotor assembly, ensure the personal safety of the tester, and record a large number of test data at the same time, so that the whole test process is more standardized, and the performance can be evaluated more accurately.

SUMMARY

The embodiments aim to overcome disadvantages in the prior art, and a testing device and a testing method of a composite blade tilt rotor power assembly are provided.

A testing device of a composite blade tilt rotor power assembly includes a tilt rotor flight power assembly, a flange platform, a rotatable cantilever shaft, a six-component balance, a tilt motor and a substrate. A height of the substrate is 2-6 m, the substrate is connected with ground through a base, and an inclined support is arranged between the substrate and the base. A top of the substrate is provided with the six-component balance, an upper surface of the six-component balance is connected with a shaft sleeve seat, and one side of the top of the substrate is provided with the tilt motor.

One end of the rotatable cantilever shaft is connected with a rotor of the tilt motor. An other end of the rotatable cantilever shaft passes through the shaft sleeve seat and extends to an outside of the substrate to connect with the flange platform. A length, extending out of the substrate, of the rotatable cantilever shaft is 1-3 m. The flange platform is connected with the tilt rotor flight power assembly through a connector. The tilt rotor flight power assembly is connected with a data acquisition computer.

In some embodiments, an interior of the shaft sleeve seat may be connected with the rotatable cantilever shaft through a small-clearance radial bearing.

In some embodiments, an upper end face of the six-component balance may be horizontal, and the cantilever shaft may be parallel to the upper end face of the six-component balance.

In some embodiments, when the flange platform may be in an initial position, a tilt rotor of the tilt rotor flight power assembly may be horizontal.

In some embodiments, the top of the substrate may be narrow and a bottom of the substrate may be wide, and the inclined support may be connected with a side, provided with the tilt motor, of the substrate.

In some embodiments, the connector may be matched with a structure of the tilt rotor flight power assembly.

A using method using the testing device of the composite blade tilt rotor power assembly includes:

installing the tilt rotor flight power assembly on the flange platform of the testing device through the connector;

confirming normal operation of an external power supply, the tilt rotor flight power assembly, and the data acquisition computer;

starting the tilt rotor flight power assembly, and controlling the tilt motor to rotate the cantilever shaft according to a tilt angle instruction;

recording energy consumption, and tensile forces and torques in x, y and z directions of the tilt rotor flight power assembly by the data acquisition computer in real time; and continuing a test until end.

The embodiments have the following beneficial effects.

Firstly, the testing device can simulate the processes of power on, starting and stopping, hovering and descending of the composite blade tilt rotor power assembly, which is a core driving component of a vertical take-off and landing type electric driving hovercar, to test the flight performance of the hovercar. The testing device can also be used for a cold rotation test, a take-off strategy verification test, a hover strategy verification test, a durability test and an acceleration performance test of the composite blade tilt rotor power assembly, so that the research and development process of the hovercar is accelerated.

Secondly, the testing device is provided with the substrate with high strength and a stable structure, so that the safety and stability in the testing process can be guaranteed. At the same time, the tilt rotor flight power assembly is lifted away from the bottom surface, so that the influence of ground effect is avoided.

Thirdly, the rotation of the tilt rotor flight power assembly is realized through the high-precision tilt motor, the rotatable cantilever shaft and the flange platform, and the rotatable cantilever shaft that extends out of the substrate, so that the interference of the substrate to the tilt rotor flight power assembly is avoided, and the testing accuracy of the device is improved.

Fourthly, the testing device adopts the connector matched with the structure of the tilt rotor flight power assembly and with high rigidity to prevent resonating under the influence of the tilt rotor flight power assembly, so that the connection of the device is more stable, and the safety and stability of the testing device are further improved.

BRIEF DESCRIPTION OF THE DRAWINGS

FIG. 6 is a flow diagram of a testing method based on a testing device according to the present disclosure.

Figure 1:
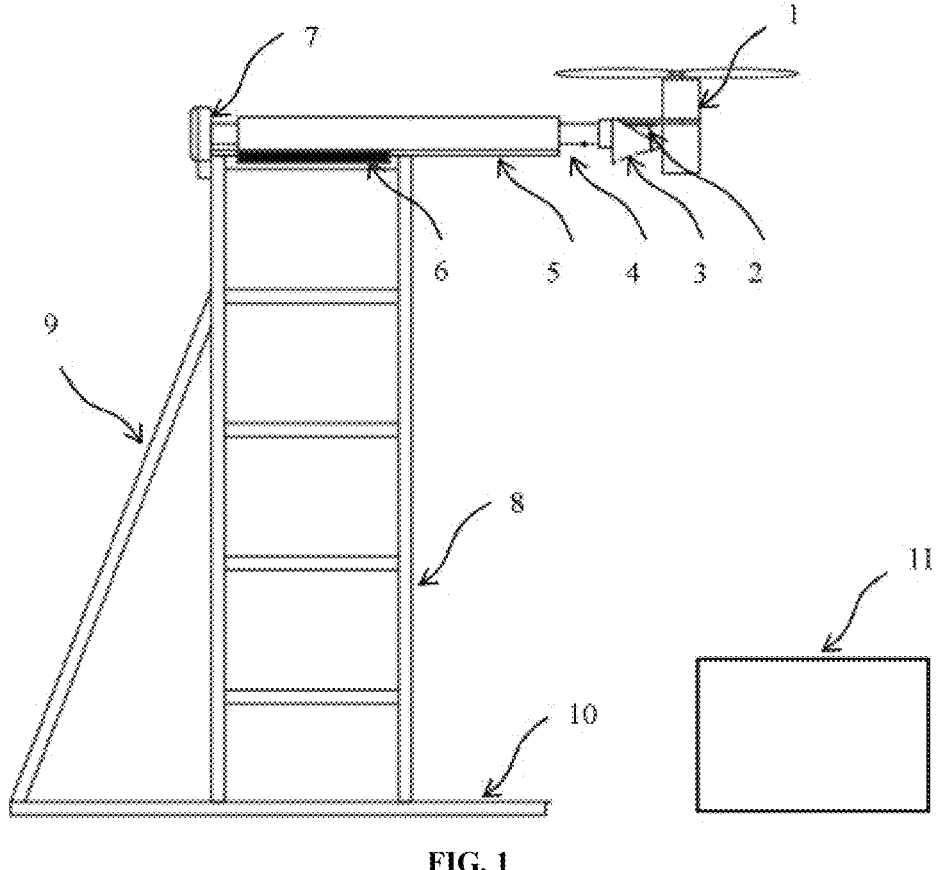
FIG. 1 is a structural schematic diagram of a testing device according to the present disclosure.

List of the reference characters: 1 tilt rotor flight power assembly; 2 connector; 3 flange platform; 4 rotatable cantilever shaft; 5 shaft sleeve seat; 6 six-component balance; 7 tilt motor; 8 substrate; 9 inclined support; 10 base; and 11 data acquisition computer.

DETAILED DESCRIPTION OF THE EMBODIMENTS

The description of the present disclosure is further described in conjunction with the following embodiments. The above description of the embodiments is only intended to assist in understanding the present disclosure. It should be noted that those skilled in the art may make several modifications without departing from the principle of the present disclosure and the improvements or modifications shall fall within the protection scope of claims in the present disclosure.

Embodiment I

Figure 2:
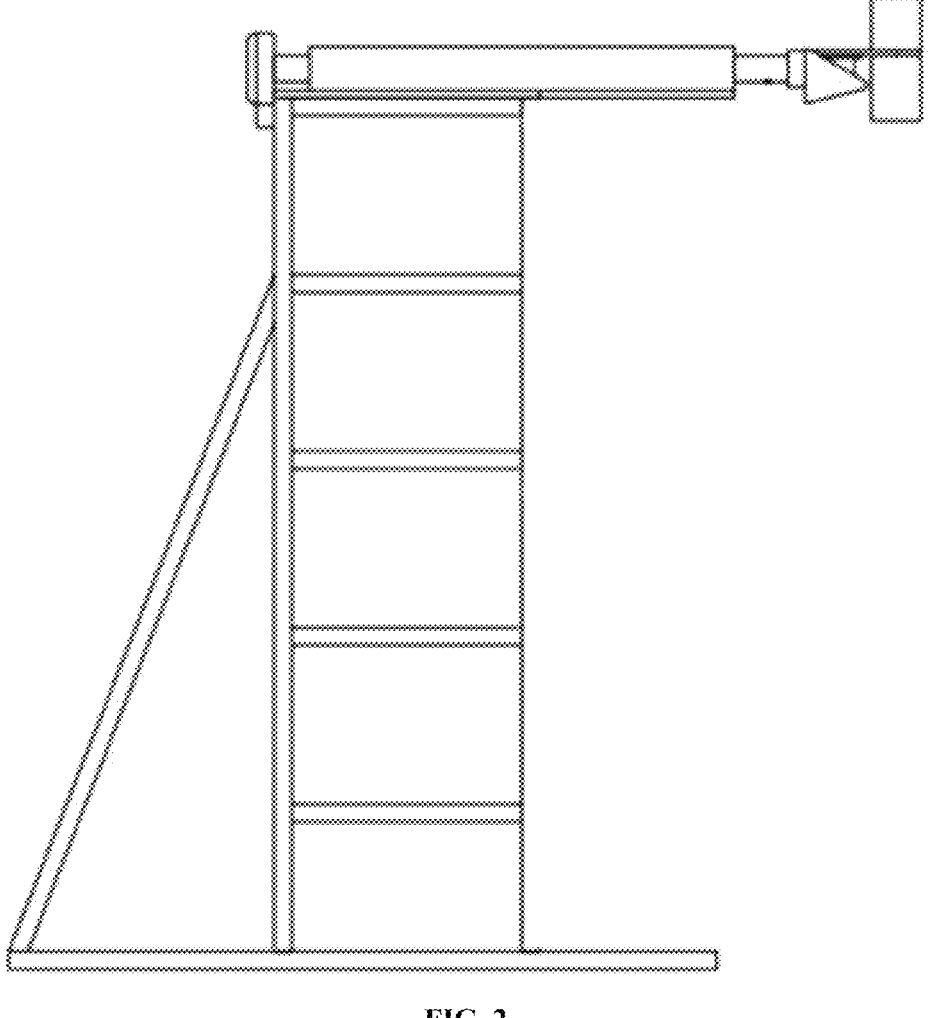
FIG. 2 is a front view of a testing device according to the present disclosure.
Figure 3:
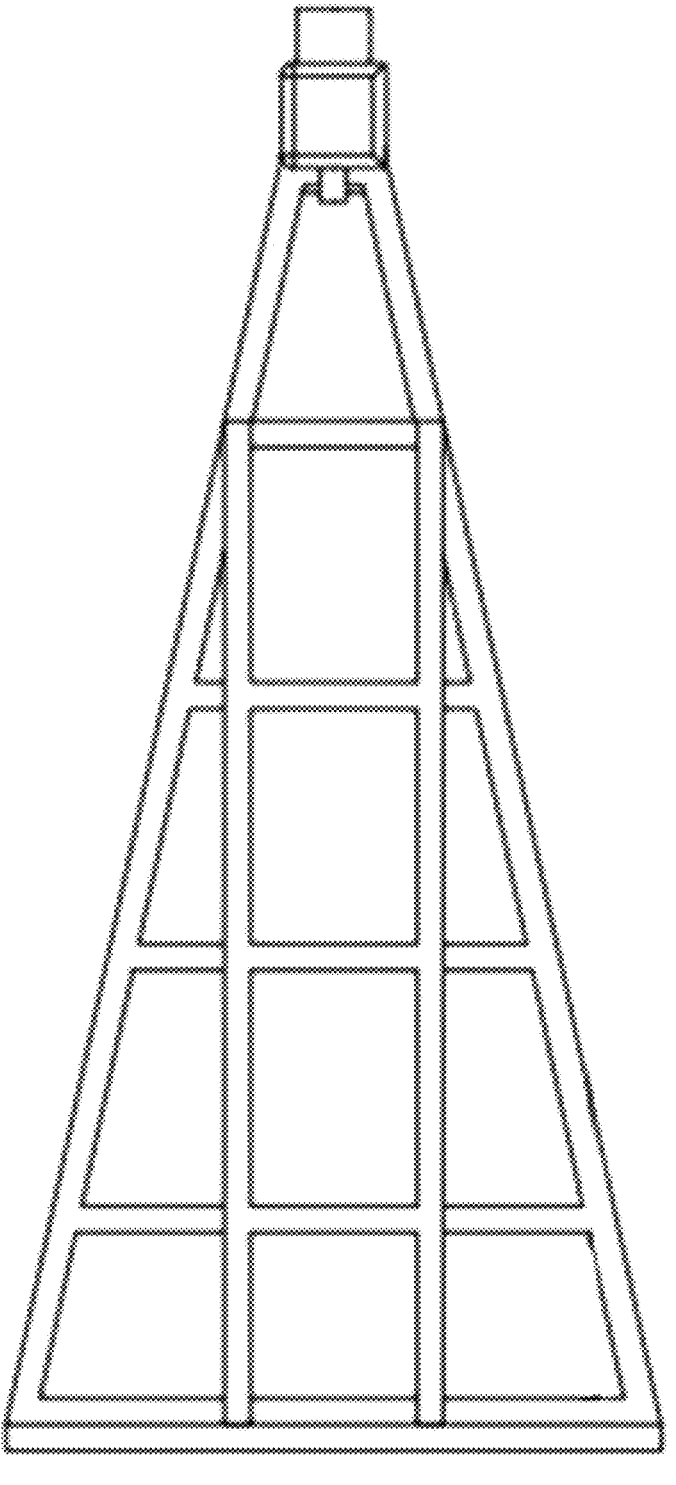
FIG. 3 is a side view of a testing device according to the present disclosure.
Figure 4:
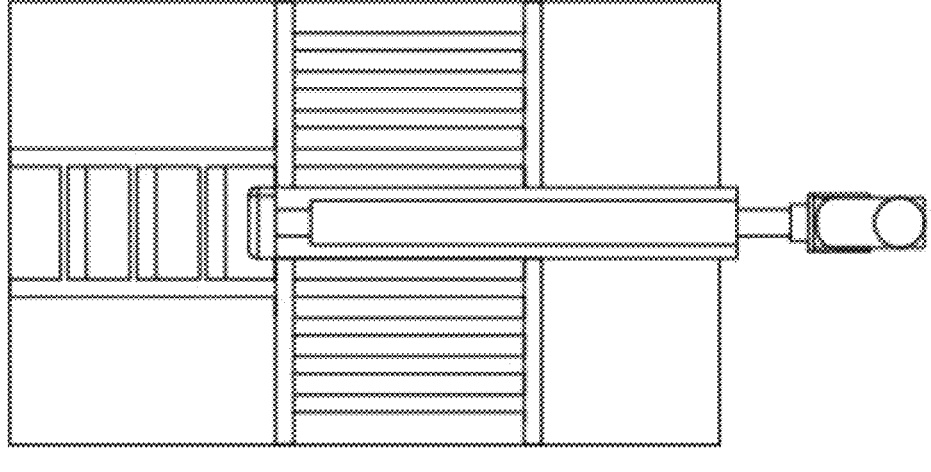
FIG. 4 is a top view of a testing device according to the present disclosure.
Figure 5:
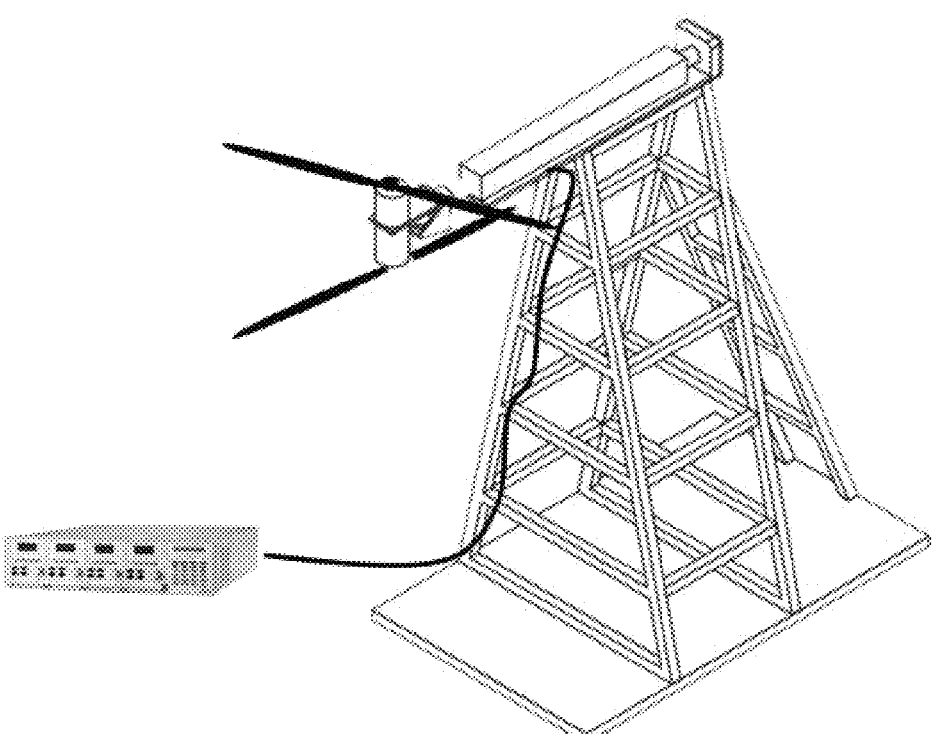
FIG. 5 is a schematic diagram of a testing process according to the present disclosure.

As an embodiment, as shown in FIG. 1 to FIG. 5, a testing device of a composite blade tilt rotor power assembly includes a tilt rotor flight power assembly 1, a flange platform 3, a rotatable cantilever shaft 4, a six-component balance 6, a tilt motor 7 and a substrate 8.

The top of the substrate 8 is narrow and the bottom of the substrate 8 is wide, and the substrate 8 has a height of 5000 mm. A downdraft ground effect generated by the tilt rotor flight power assembly 1 is eliminated. The substrate 8 ensures high strength by structural design such as reinforcing ribs, and can maintain high stability, especially in the case of vibration and force applied to the flange platform 3. A base 10 is arranged at the bottom of the substrate 8. The base 10 is 4000 mm in length, 2500 mm in width and 1000 mm in thickness, and is made of cast iron. An oblique support 9 connected with the base 10 is arranged at the height of 4000 mm on a side surface of the substrate 8, and is integrally connected with the substrate 8 by brazing.

The top of the substrate 8 is provided with the six-component balance 6, and the six-component balance 6 is box-shaped or square. A top surface of the six-component balance 6 is fixed with a shaft sleeve seat 5, and a bottom surface of the six-component balance 6 is fixed with the top of the substrate. An end face of the six-component balance 6 is 560 mm in length and width and 112 mm in height. An upper surface of the six-component balance 6 is connected with the shaft sleeve seat 5.

One side of the top of the substrate 8 is provided with the tilt motor 7. The tilt motor 7 is a high-precision angular servo motor, and can accurately adjust the tilt angle of the rotatable cantilever shaft 4. The rated power of the tilt motor 7 is 1000 watts, the rated voltage is 220 V, and the deflection angle control accuracy is +/−0.1°.

The rotatable cantilever shaft 4 is in a hollow circular design with an outer diameter of 100 mm and a hollow inner diameter of 80 mm, and is made of aluminum alloy with a total mass of 27 kg. In order to reduce the mass, a hollow barrel shape can also be considered.

One end of the rotatable cantilever shaft 4 is connected with a rotor of the tilt motor 7, and the other end of the rotatable cantilever shaft 4 passes through the shaft sleeve seat 5. The shaft sleeve seat 5 is internally provided with a radial bearing which has the functions of fastening, bearing, rotating and lubricating the rotatable cantilever shaft 4. The radial bearing is a cylindrical roller or other small-clearance structure bearing. The bearing and a raceway which are line contact bearings are large in load capacity, and mainly bear radial load. The bearing is a structure of which an inner ring and an outer ring are separable.

The rotatable cantilever shaft 4 extends from the shaft sleeve seat 5 to the outside of the substrate 8, and is connected with the flange platform 3 at the end. The flange platform 3 is a mechanism with a flange surface, and one end of the flange platform 3 is connected with the rotatable cantilever shaft 4. The design follows the national standard 9113.1-2000, in which the outer diameter is 200 mm, the concentric circle diameter is 160 mm, the bolt hole diameter is 18 mm and the bolt hole number is 8. The rotatable cantilever shaft 4 extends to the outside of the substrate 8 and rotates along a rotor center axis of the tilt motor 7. On one hand, the substrate 8 is prevented from blocking the downdraft ground effect generated by the tilt rotor flight power assembly 1, and on the other hand, the interference problem between a double-layer composite blade in a testing state and the substrate 8 is also solved. When the flange platform 3 is in an initial position, a tilt rotor of the tilt rotor flight power assembly 1 is horizontal so as to eliminate measurement errors caused by deflection.

The flange platform 3 is connected with the tilt rotor flight power assembly 1 through a connector 2. The connector 2 is developed according to the structure of the tilt rotor flight power assembly 1. The tilt rotor flight power assembly 1 is assembled by two motors with a diameter of about 200 mm back to back, and the connector 2 is fixed from a gap between the two motors back to back. The connector 2 is customized in advance. One end of the connector 2 is matched with the tilt rotor flight power assembly 1, and the other end of the connector 2 is matched with the flange platform 3. The thickness of the connector 2 is 10 mm, and the stiffness of the connector 2 is large enough. Specifically, the connector 2 cannot cause vibration in the low-frequency band of the common working conditions of the rotor.

The tilt rotor flight power assembly 1 is connected with a data acquisition computer 11. The data acquisition computer 11 is configured for acquiring the tilt angle, current, voltage, rotational speed and other parameters of the tilt rotor flight power assembly 1 and saving the parameters in real time, and the measured values of different sensors under the same time axis can be unified and exported to generate an Excel document. An acquisition device is connected with a notebook computer. A power system is controlled by upper computer software, and data is displayed and recorded in real time. The time axis of the recorded parameters is kept unified, and a USB (Universal Serial Bus) port is provided as a communication port.

Embodiment II

As another embodiment, according to the testing device of the composite blade tilt rotor power assembly proposed in the embodiment I, a testing method of the composite blade tilt rotor power assembly using the testing device proposed by the embodiment, as shown in FIG. 6, includes the following steps.

In S1, a tilt rotor flight power assembly 1 is installed on a flange platform 3 of a testing device through a connector 2, and bolts with a diameter of 8 mm are used for fixation.

In S2, normal operation of an external power supply, the tilt rotor flight power assembly 1 and a data acquisition computer 11 are confirmed. The used power supply is a battery simulator with a rated power of 50 kW, a peak power of 80 kW and a control range of 2-50 kW. The power for electrically driving a single motor of the tilt rotor in the tilt rotor flight power assembly 1 is 15 kW, and the power of a composite blade electric driving assembly is 30 kW.

In S3, the tilt rotor flight power assembly 1 is started, and a tilt motor 7 is controlled to rotate a cantilever shaft 4 according to a tilt angle instruction. The working conditions of take-off and landing, hovering and front-and-back stable flight of a hovercar are simulated.

In S4, the energy consumption of the tilt rotor flight power assembly 1 and the tensile forces and torques in x, y and z directions are recorded by the data acquisition computer 11 in real time. The sampling frequency of the data acquisition computer 11 is 20 Hz to obtain double-precision floating point type data.

In S5, the test is continued until the end.

What is claimed is:

1. A testing device of a composite blade tilt rotor power assembly, comprising a tilt rotor flight power assembly (1), a flange platform (3), a rotatable cantilever shaft (4), a six-component balance (6), a tilt motor (7) and a substrate (8), wherein a height of the substrate (8) is 2-6 m, the substrate (8) is connected with ground through a base (10), and an inclined support (9) is arranged between the substrate (8) and the base; a top of the substrate (8) is provided with the six-component balance (6), an upper surface of the six-component balance (6) is connected with a shaft sleeve seat (5), and one side of the top of the substrate (8) is provided with the tilt motor (7);

one end of the rotatable cantilever shaft (4) is connected with a rotor of the tilt motor (7), an other end of the rotatable cantilever shaft (4) passes through the shaft sleeve seat (5) and extends to an outside of the substrate (8) to connect with the flange platform (3), a length, extending out of the substrate (8), of the rotatable cantilever shaft (4) is 1-3 m, the flange platform (3) is connected with the tilt rotor flight power assembly (1) through a connector (2), and the tilt rotor flight power assembly (1) is connected with a data acquisition computer (11).

2. The testing device of the composite blade tilt rotor power assembly according to claim 1, wherein an interior of the shaft sleeve seat (5) is connected with the rotatable cantilever shaft (4) through a small-clearance radial bearing.

3. The testing device of the composite blade tilt rotor power assembly according to claim 1, wherein an upper end face of the six-component balance (6) is horizontal, and the cantilever shaft (4) is parallel to the upper end face of the six-component balance (6).

4. The testing device of the composite blade tilt rotor power assembly according to claim 3, wherein when the flange platform (3) is in an initial position, a tilt rotor of the tilt rotor flight power assembly (1) is horizontal.

5. The testing device of the composite blade tilt rotor power assembly according to claim 1, wherein the top of the substrate (8) is narrow and a bottom of the substrate (8) is wide, and the inclined support (9) is connected with a side, provided with the tilt motor (7), of the substrate (8).

6. The testing device of the composite blade tilt rotor power assembly according to claim 1, wherein the connector (2) is matched with a structure of the tilt rotor flight power assembly (1).

7. A using method for a testing device of a composite blade tilt rotor power assembly, the testing device of the composite blade tilt rotor power assembly comprising a tilt rotor flight power assembly (1), a flange platform (3), a rotatable cantilever shaft (4), a six-component balance (6), a tilt motor (7) and a substrate (8), wherein a height of the substrate (8) is 2-6 m, the substrate (8) is connected with ground through a base (10), and an inclined support (9) is arranged between the substrate (8) and the base; a top of the substrate (8) is provided with the six-component balance (6), an upper surface of the six-component balance (6) is connected with a shaft sleeve seat (5), and one side of the top of the substrate (8) is provided with the tilt motor (7);

one end of the rotatable cantilever shaft (4) is connected with a rotor of the tilt motor (7), an other end of the rotatable cantilever shaft (4) passes through the shaft sleeve seat (5) and extends to an outside of the substrate (8) to connect with the flange platform (3), a length, extending out of the substrate (8), of the rotatable cantilever shaft (4) is 1-3 m, the flange platform (3) is connected with the tilt rotor flight power assembly (1) through a connector (2), and the tilt rotor flight power assembly (1) is connected with a data acquisition computer (11) wherein the using method comprises:

installing the tilt rotor flight power assembly (1) on the flange platform (3) of the testing device through the connector (2);

confirming normal operation of an external power supply, the tilt rotor flight power assembly (1) and the data acquisition computer (11);

starting the tilt rotor flight power assembly (1), and controlling the tilt motor (7) to rotate the cantilever shaft (4) according to a tilt angle instruction;

recording energy consumption and tensile forces and torques in x, y and z directions of the tilt rotor flight power assembly (1) by the data acquisition computer (11) in real time; and continuing a test until end.

\* \* \* \* \*